United States Patent
Haig

(10) Patent No.: US 12,141,523 B1
(45) Date of Patent: Nov. 12, 2024

(54) AUTOMATIC STRUCTURE SELECTION AND CONTENT FILL WITHIN A GROUP-BASED COMMUNICATION SYSTEM

(71) Applicant: Salesforce, Inc., San Francisco, CA (US)

(72) Inventor: Anders Haig, Camarillo, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 18/215,401

(22) Filed: Jun. 28, 2023

(51) Int. Cl.
  *G06Q 10/10* (2023.01)
  *G06F 40/186* (2020.01)
  *H04L 51/216* (2022.01)

(52) U.S. Cl.
  CPC ......... *G06F 40/186* (2020.01); *G06Q 10/103* (2013.01); *H04L 51/216* (2022.05)

(58) Field of Classification Search
  CPC ...... G06F 40/186; G06F 40/10; G06F 40/174; H04L 51/216; G06Q 10/103
  See application file for complete search history.

(56) References Cited

U.S. PATENT DOCUMENTS

| | | | |
|---|---|---|---|
| 2017/0147296 A1* | 5/2017 | Kumar | G06Q 10/06 |
| 2022/0327282 A1* | 10/2022 | Schuck | G06F 40/186 |
| 2023/0087481 A1 | 3/2023 | Brevoort et al. | |
| 2023/0153723 A1* | 5/2023 | Srinath | G06F 9/54 705/7.27 |
| 2023/0376838 A1* | 11/2023 | El Hattami | G06F 40/35 |

OTHER PUBLICATIONS

Pierre Hankach et al., Utterance Templates Merging in Automaton-based Dialogue Systems, Oct. 1, 2008, International Conference on Natural Language Processing and Knowledge Engineering, pp. 1-7 (Year: 2008).*
Hameedullah Farooki et al., Interactive and Scalable Layout Synthesis with Design Templates, Dec. 1, 2020, IEEE International Conference on Artificial Intelligence and Virtual Reality, pp. 235-238 (Year: 2020).*

* cited by examiner

*Primary Examiner* — Tam T Tran
(74) *Attorney, Agent, or Firm* — Lee & Hayes, P.C.

(57) ABSTRACT

Media, methods, and systems for automatically selecting and prefilling template structures within a group-based communication system. A template structure is automatically selected based on a received user input. A prompt including one or more keywords from the user input is submitted to a content fill model. The content fill model returns a response with content output used to automatically populate one or more content fields within the template structure.

20 Claims, 12 Drawing Sheets

FIG. 2B

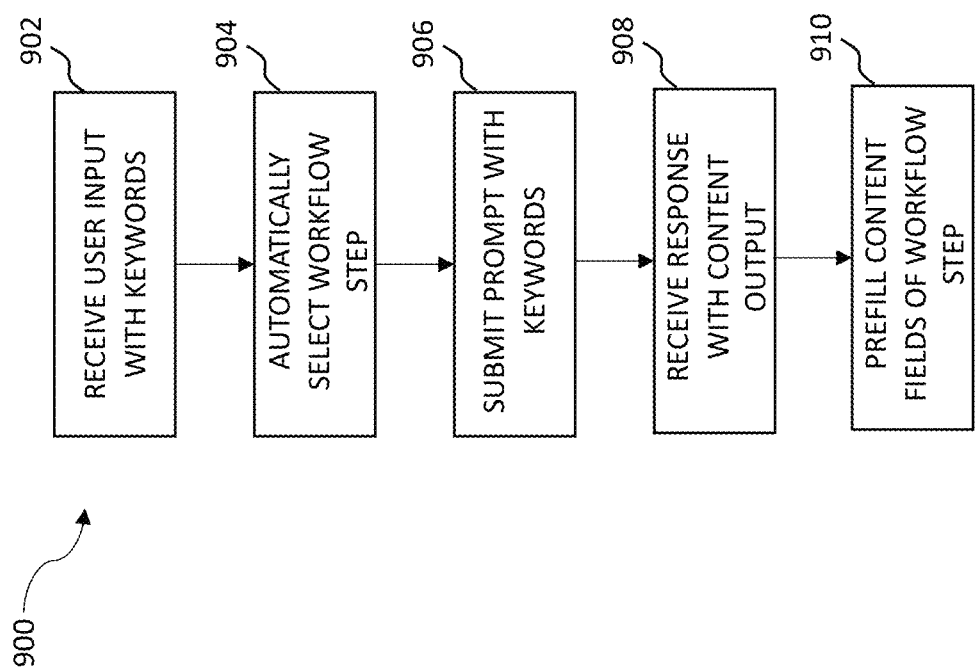

AUTOMATIC STRUCTURE SELECTION AND CONTENT FILL WITHIN A GROUP-BASED COMMUNICATION SYSTEM

TECHNICAL FIELD

Embodiments of the present disclosure generally relate to automatic content fill. More specifically, embodiments of the present disclosure relate to automatic structure selection and content fill within a group-based communication system.

BACKGROUND

Advanced software features such as automated workflows may be used to increase efficiency and reduce manual interference within a communication platform. However, said automated workflows may be difficult for non-technical users to create and modify. It becomes difficult to distill workflow setup into simple steps for a non-technical user to follow aside from allowing said non-technical users to choose from a static set of existing templates. Accordingly, setup of said automated workflows may be limited to technically savvy developer users. Even then, creating automated workflows or modifying workflow templates can consume relatively large amounts the user's time.

Artificial intelligence techniques such as prompt submissions to a large language model may be employed to provide content to a user. However, said artificial intelligence techniques have low accuracy and rely heavily on the format and context provided in the prompt. Accordingly, said prompts must be heavily catered to generate a useable output.

BRIEF DESCRIPTION OF THE FIGURES

Embodiments of the present disclosure are described in detail below with reference to the attached drawing figures, wherein:

FIG. 2B illustrates a user interface for synchronous multimedia collaboration sessions within the group-based communication system for certain embodiments;

FIG. 9 illustrates an exemplary method for step addition and content fill relating to some embodiments.

Figure 1:
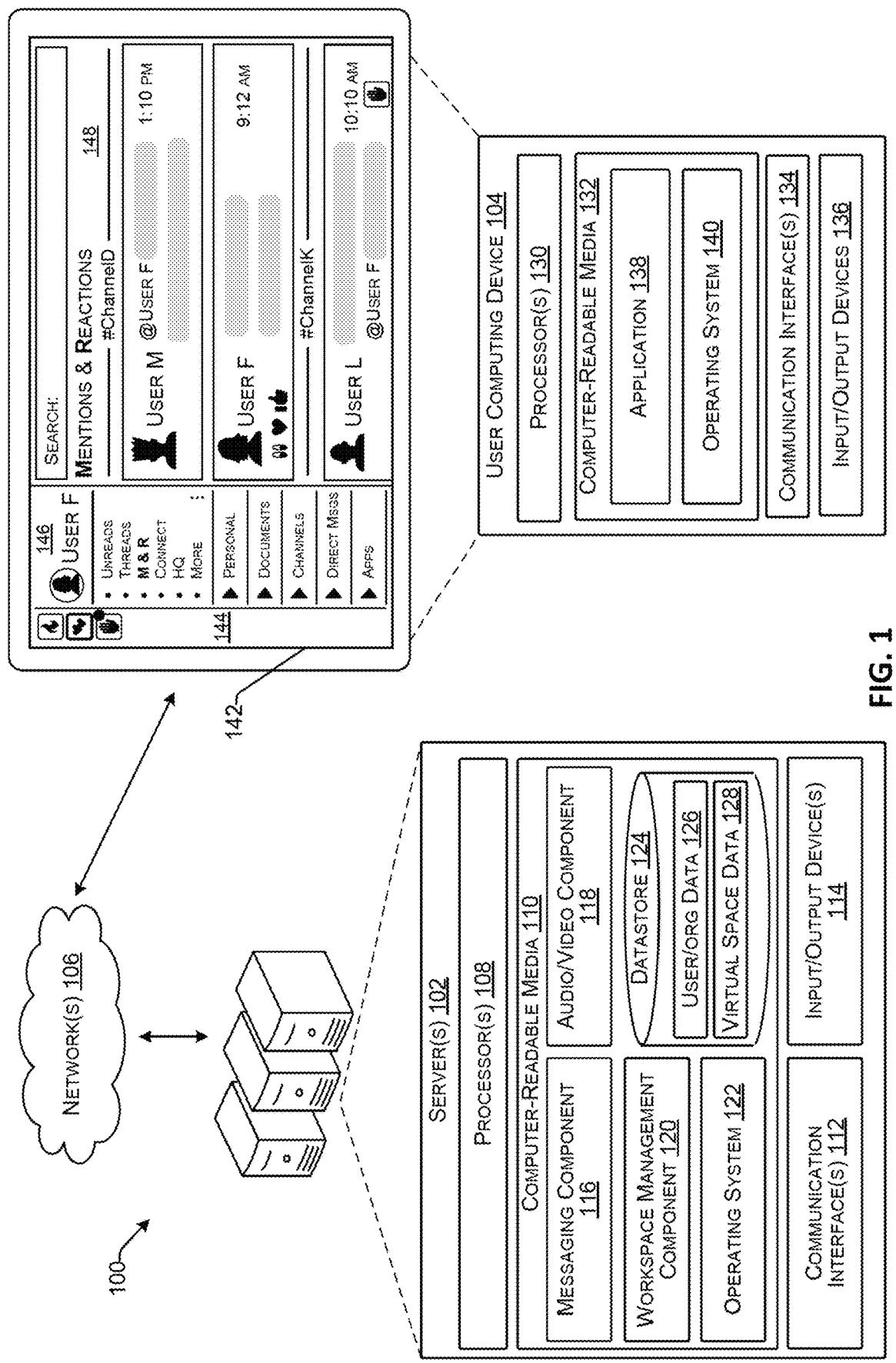
FIG. 1 illustrates an exemplary environment for certain embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description of embodiments of the present disclosure references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of embodiments of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with the same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IoT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102, such as performing the methods described below. Functional components stored in the computer-readable media can optionally include a messaging component 116, an audio/video component 118, a workspace management component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a time-stamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of the user interface associated with one or more of the users associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the workspace management component 120 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 120 can manage workspace membership. That is, the workspace management component 120 can receive requests to associate users with individual workspaces and the workspace management component 120 can associate user accounts associated with such users with group identifiers associated with the individual workspaces. For example, responsive to receiving a request to add a user to a workspace, the workspace management component 120 can associate a user account of the user with a group identifier of the workspace. The workspace management component 120 can disassociate user accounts and group identifiers, for example, when a user is removed from a workspace.

In at least one example, the workspace management component 120 can manage cross-workspace data integration, as described herein. For example, the workspace management component 120 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 120 can detect updates to data associated with a workspace and can integrate such updated data into user interface(s) presented via user computing device(s) of user(s) associated with the workspace. Similarly, the workspace management component 120 can facilitate cross-workspace operations. For example, the workspace management component 120 can facilitate messages between workspaces, searches between or across multiple workspaces, and the like. Additional details of operations that can be performed by the workspace management component 120 are described below.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform, or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server(s) 102, the user computing device 104, or a combination thereof.

User Interface for a Group-Based Communication System

Figure 2A:
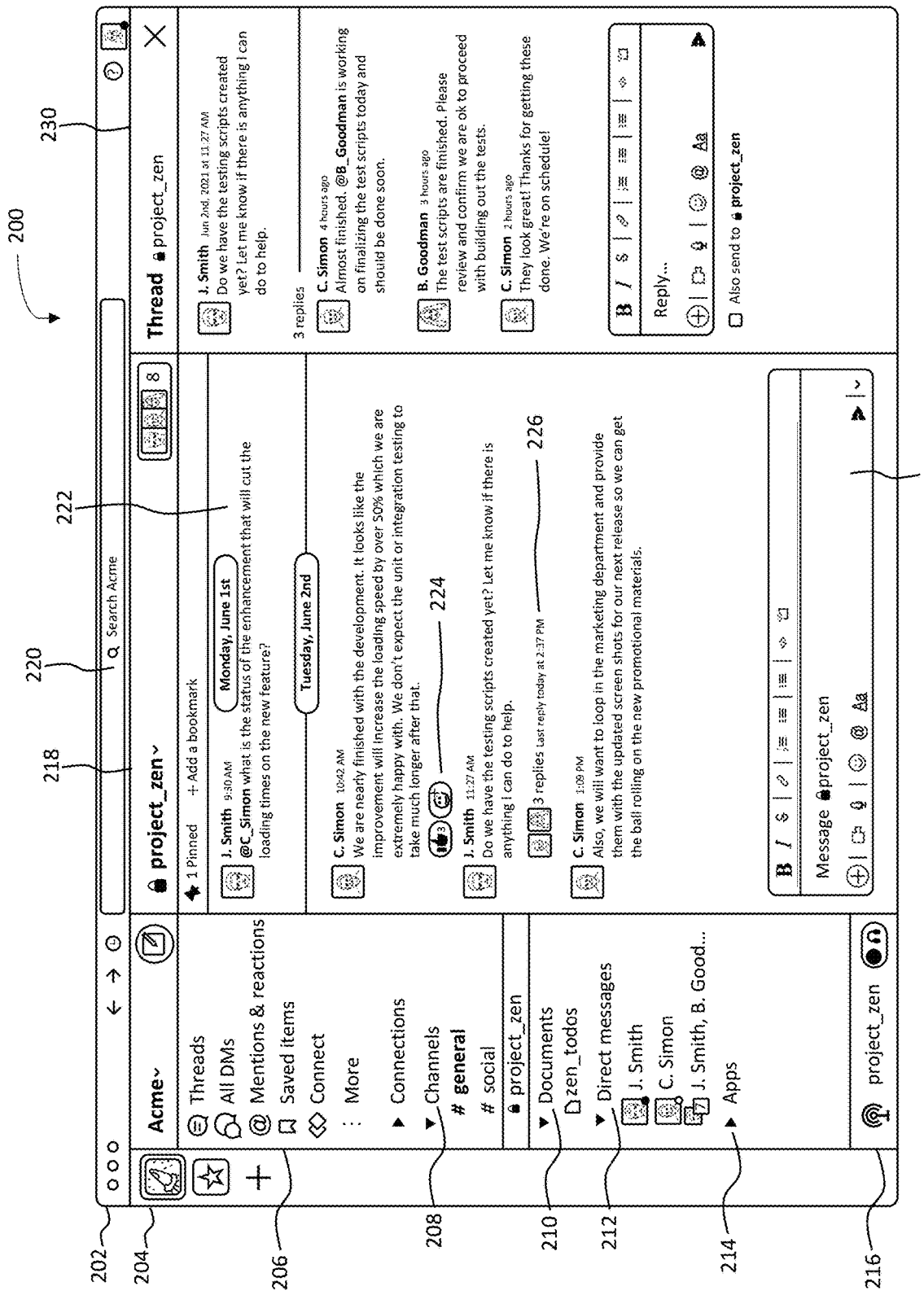
FIG. 2A illustrates a user interface for a group-based communication system for certain embodiments.

FIG. 2A illustrates a user interface 200 of a group-based communication system, which will be useful in illustrating the operation of various embodiments, as discussed in further detail below. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

User interface 200 comprises a plurality of objects such as panes, text entry fields, buttons, messages, or other user interface components that are viewable by a user of the group-based communication system. As depicted, user interface 200 comprises title bar 202, workspace pane 204, navigation pane 206, synchronous multimedia collaboration session pane 216, channel pane 218, and thread pane 230.

In some embodiments, title bar 202 comprises search bar 220. Search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some embodiments, title bar 202 comprises navigation commands allowing a user to move backwards and forwards between different panes, as well as to view a history of accessed content. Title bar 202 may comprise additional resources such as links to help documents and user configuration settings.

In some embodiments, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some embodiments, user interface 200 comprises workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some embodiments, an organization, such as a particular company, may have a plurality of workspaces, and the user may be associated with one or more workspaces belonging to the organization. In yet other embodiments, a particular workspace can be associated with one or more organizations or other entities associated with the group-based communication system.

In some embodiments, navigation pane 206 permits users to navigate between virtual spaces such as pages, channels 208, collaborative documents 210 (such as those discussed at FIG. 2D), applications 214, and direct messages 212 within the group-based communication system. For example, navigation pane 206 can include indicators representing virtual spaces that can aggregate data associated with a plurality of virtual spaces of which the user is a member. In at least one example, each virtual space can be associated with an indicator in navigation pane 206. In some examples, an indicator can be associated with an actuation mechanism (e.g., affordance) such that when actuated, can cause user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

Navigation pane 206 may further comprise indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces or, alternatively, may only be associated with one of the workspaces. In some examples, the communication channels represented can be associated with combinations of communication channels associated with a single workspace and communication channels associated with different workspaces.

In some embodiments, navigation pane 206 may depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, navigation pane 206 can depict all communication channels, or a subset of all communication channels, that the user is a member of, and the user can interact with user interface 200 to browse or view other communication channels that the user is not a member of but are not currently displayed in navigation pane 206. In some examples, different types of communication channels (e.g., public, private, shared, cross-workspace, etc.) can be in different sections of navigation pane 206, or can have their own sub-regions or sub-panes in the user interface 200. In some examples, communication channels associated with different workspaces can be in different sections of navigation pane 206 or can have their own regions or panes in user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, navigation pane 206 can include indicators representative of communications with individual users or multiple specified users (e.g., instead of all, or a subset of, members of an organization). Such communications can be referred to as "direct messages." Navigation pane 206 can include indicators representative of virtual spaces that are associated with private messages between one or more users.

Direct messages 212 may be communications between a first user and a second user, or they may be multi-person direct messages between a first user and two or more second users. Navigation pane 206 may be sorted and organized into hierarchies or sections depending on the user's preferences. In some embodiments, all of the channels to which a user has been granted access may appear in navigation pane 206. In other embodiments, the user may choose to hide certain channels or collapse sections containing certain channels. Items in navigation pane 206 may indicate when a new message or update has been received or is currently unread, such as by bolding the text associated with a channel in which an unread message is located or adding an icon or badge (for example, with a count of unread messages) to the channel name. In some embodiments, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally, though not illustrated, navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels Within the Group-Based Communication System

In some embodiments, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some embodiments, channel pane 218 may display information related to a channel that a user has selected in navigation pane 206. For example, a user may select the project_zen channel to discuss the ongoing software development efforts for Project Zen. In some embodiments, channel pane 218 may include a header comprising information about the channel, such as the channel name, the list of users in the channel, and other channel controls. Users may be able to pin items to the header for later access and to add bookmarks to the header. In some embodiments, links to collaborative documents may be included in the header. In further embodiments, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via channel pane 218 of user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

Channel pane 218 may include messages such as message 222, which is content posted by a user into the channel. Users may post text, images, videos, audio, or any other file as message 222. In some embodiments, particular identifiers (in messages or otherwise) may be denoted by prefixing them with predetermined characters. For example, channels may be prefixed by the "#" character (as in #project_zen) and username may be prefixed by the "@" character (as in @austin_a). Messages such as message 222 may include an indication of which user posted the message and the time at which the message was posted. In some embodiments, users may react to messages such as message 222 by selecting reaction button 224. Reaction button 224 allows users to select an icon (sometimes called a reactji in this context), such as a thumbs up, to be associated with the message. Users may respond to messages such as message 222 of another user with a new message such as message 222. In some embodiments, such conversations in channels may further be broken out into threads. Threads may be used to aggregate messages related to a particular conversation together to make the conversation easier to follow and reply to, without cluttering the main channel with the discussion. Under the message beginning the thread appears thread reply preview 226. Thread reply preview 226 may show information related to the thread, such as, for example, the number of replies and the members who have replied. Thread replies may appear in thread pane 230 that may be separate from channel pane 218 and may be viewed by other members of the channel by selecting thread reply preview 226 in channel pane 218.

In some embodiments, one or both of channel pane 218 and thread pane 230 may include compose pane 228. Compose pane 228 allows users to compose and transmit messages 222 to the members of the channel or to those members of the channel who are following the thread (when the message is sent in a thread). Compose pane 228 may have text editing functions such as bold, strikethrough, and italicize. Compose pane 228 may also allow users to format their messages or attach files such as collaborative documents, images, videos, or any other files to share with other members of the channel. In some embodiments, compose pane 228 may enable additional formatting options such as numbered or bulleted lists via either the user interface or an API. Compose pane 228 may also function as a workflow trigger to initiate workflows related to a channel or message. In further embodiments, links or documents sent via compose pane 228 may include unfurl instructions related to how the content should be displayed.

Synchronous Multimedia Collaboration Sessions

Figure 2B:
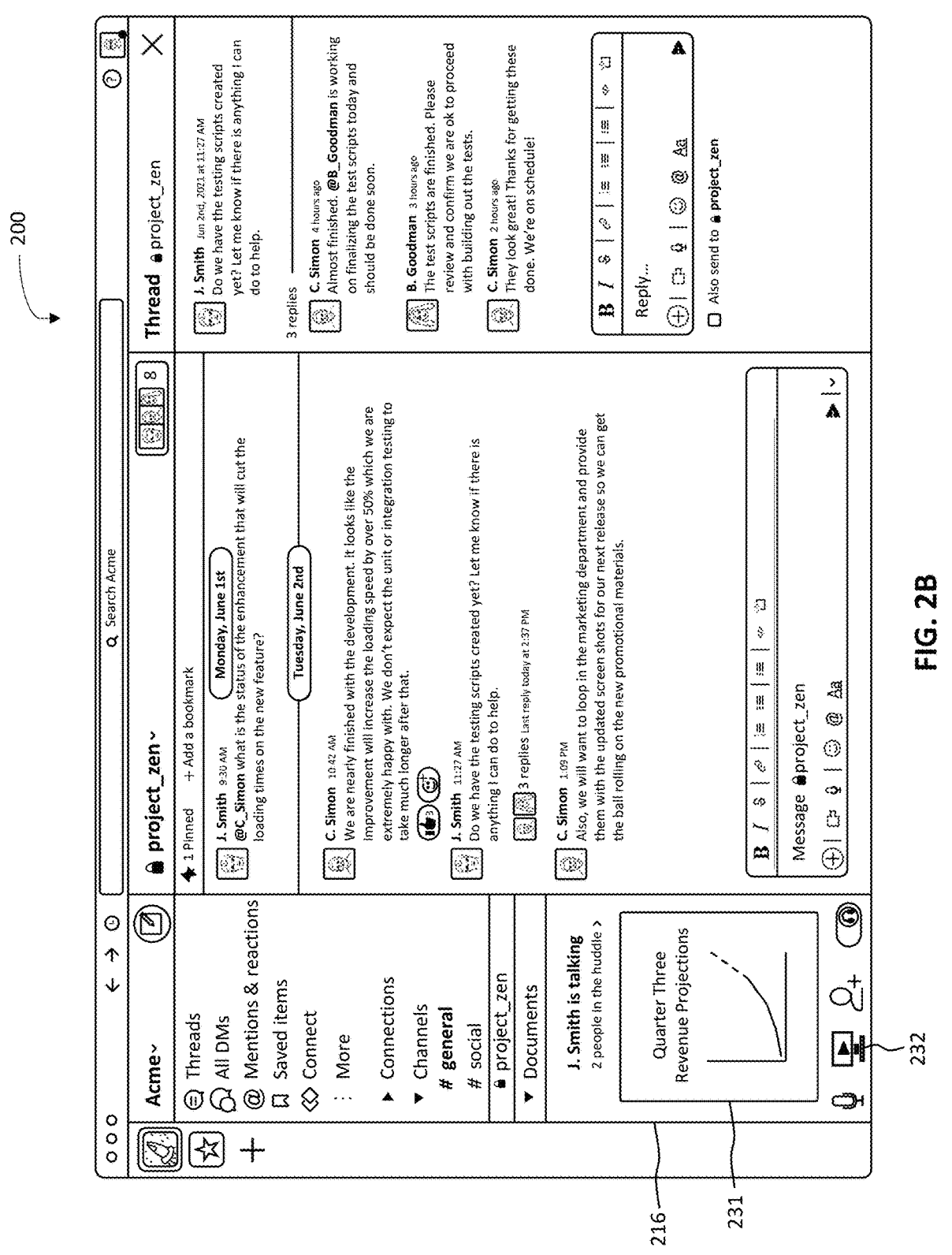

FIG. 2B illustrates a synchronous multimedia collaboration session that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, a particular direct message or multi-person direct message, or a set of users, while in other embodiments, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some embodiments, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without relying on scheduling or initiating a communication session through a third-party interface. In some embodiments, users may be directly invited to attend a synchronous multimedia collaboration session via a message or notification.

Synchronous multimedia collaboration sessions may be short, ephemeral sessions from which no data is persisted. Alternatively, in some embodiments, synchronous multimedia collaboration sessions may be recorded, transcribed, and/or summarized for later review. In other embodiments, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some embodiments, members of the synchronous multimedia collaboration session may mark-up, comment on, draw on, or otherwise annotate a shared screen. In further embodiments, such annotations may be saved and persisted after the synchronous multimedia collaboration session has ended. A canvas may be created directly from a synchronous multimedia collaboration session to further enhance the collaboration between users.

In some embodiments, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 231. In some embodiments, users in the synchronous multimedia collaboration session may be displayed with an icon indicating that they are participating in the synchronous multimedia collaboration session. In further embodiments, an expanded view of the participants may show which users are active in the synchronous multimedia collaboration session and which are not. Screen share preview 231 may depict the desktop view of a user sharing the user's screen, or a particular application or presentation. Changes to the user's screen, such as the user advancing to the next slide in a presentation, will automatically be depicted in screen share preview 231. In some embodiments, screen share preview 231 may be actuated to cause screen share preview 231 to be enlarged such that it is displayed as its own pane within the group-based communication system. Synchronous multimedia collaboration session pane 216 may comprise tools for the synchronous multimedia collaboration session allowing a user to mute the user's microphone or invite other users. In some embodiments, synchronous multimedia collaboration session pane 216 may comprise screen share button 232. Screen share button 232 may permit a user to share the user's screen with other members of the synchronous multimedia collaboration session pane 216. In some embodiments, screen share button 232 may provide a user with additional controls during a screen share. For example, a user sharing the user's screen may be provided with additional screen share controls to specify which screen to share, to annotate the shared screen, or to save the shared screen. When no synchronous multimedia collaboration session is active, synchronous multimedia collaboration session pane 216 may be associated with a currently selected channel, direct message, or multi-person direct message such that a synchronous multimedia collaboration session may be initiated and associated with the currently selected channel, direct message, or multi-person direct message. Similarly, when a synchronous multimedia collaboration session is active, the synchronous multimedia collaboration session pane 216 may be associated with a channel in which the synchronous multimedia collaboration session was initiated. In some embodiments, synchronous multimedia collaboration session pane 216 may instead be unassociated with any channels, multi-person direct messages, or direct messages.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some embodiments, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some embodiments, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some embodiments, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some embodiments, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some embodiments, one or more recommended asynchronous multimedia collaboration sessions or meetings are displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some embodiments, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some embodiments, a preview of a subset of video replies may be shown in the asynchronous collaboration session or thread. This can allow, for example, a user to jump to a relevant segment of the asynchronous multimedia collaboration session or to pick up where they left off previously.

In some embodiments, the group-based communication system may comprise one or more canvases (or one or more links to canvases). A canvas can include a flexible workspace for curating, organizing, and sharing collections of information between users. Such canvases may be associated with a synchronous multimedia collaboration session, an asynchronous multimedia collaboration session, a channel, a multi-person direct message conversation, or a direct message conversation. Alternatively, or in addition, a user might have one or more private canvases that are not associated with any other users. Shared canvases can be configured to be accessed and/or modified by two or more users with appropriate permissions. In some embodiments, canvases can be configured to enable sharing of content including (but not limited to) text, images, videos, GIFs, drawings (e.g., user-generated drawings via a drawing interface), or gaming content. In some embodiments, users accessing a canvas can add new content or delete (or modify) content previously added. In some embodiments, appropriate permissions may be utilized for a user to add content or to delete or modify content added by a different user. Thus, for example, some users may only be able to access a canvas in view-only mode, while other users may be able to access the canvas in an edit mode allowing those users to add or modify its contents. In some examples, a canvas can be shared via a message in a channel, multi-person direct message, or direct message, such that data associated with the canvas is accessible to and/or rendered interactable for members of the channel or recipients of the multi-person direct message or direct message.

Connecting Within the Group-Based Communication System

Figure 2C:
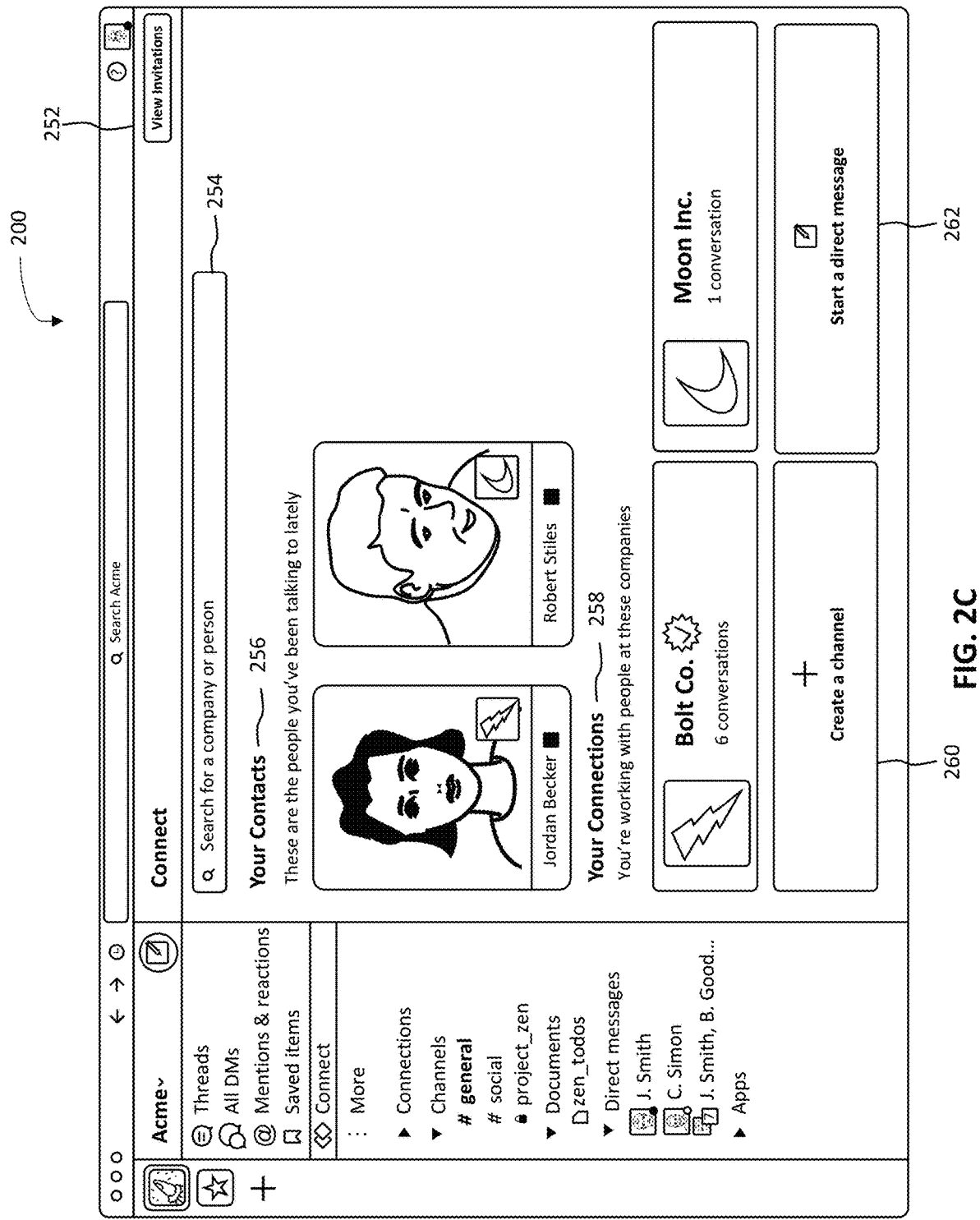
FIG. 2C illustrates a user interface for inter-organization collaboration within the group-based communication system for certain embodiments.

FIG. 2C illustrates user interface 200 displaying connect pane 252. Connect pane 252 provides tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. Connect pane 252 may enable users to determine which other users and organizations are already within the group-based communication system, and to invite those users and organizations currently outside of the group-based communication system to join.

Connect pane 252 may comprise connect search bar 254, recent contacts 256, connections 258, create channel button 260, and start direct message button 262. Connect search bar 254 permits a user to search for users within the group-based communication system. In some embodiments, only users from organizations that have connected with the user's organization will be shown in the search results. In other embodiments, users from any organization that uses the group-based communication system can be displayed. In still other embodiments, users from organizations that do not yet use the group-based communication can also be displayed, allowing the searching user to invite them to join the group-based communication system. In some embodiments, users can be searched for via their group-based communication system username or their email address. In some embodiments, email addresses may be suggested or autocompleted based on external sources of data such as email directories or the searching user's contact list.

In some embodiments, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some embodiments, recent contacts 256 may display users with whom the instant user has recently interacted. The recent contacts 256 may display the user's name, company, and a status indication. Recent contacts 256 may be ordered based on which contacts the instant user most frequently interacts with or based on the contacts with whom the instant user most recently interacted. In some embodiments each recent contact of recent contacts 256 may be an actuatable control allowing the instant user to quickly start a direct message conversation with the recent contact, invite them to a channel, or take any other appropriate user action for that recent contact.

In some embodiments, connections 258 may display a list of companies (e.g., organizations) with which the user has interacted. For each company, the name of the company may be displayed along with the company's logo and an indication of how many interactions the user has had with the company, for example the number of conversations. In some embodiments, each connection of connections 258 may be an actuatable control allowing the instant user to quickly invite the external organization to a shared channel, display recent connections with that external organization, or take any other appropriate organization action for that connection.

In some embodiments, create channel button 260 allows a user to create a new shared channel between two different organizations. Selecting create channel button 260 may further allow a user to name the new connect channel and enter a description for the connect channel. In some embodiments, the user may select one or more external organizations or one or more external users to add to the shared channel. In other embodiments, the user may add external organizations or external users to the shared channel after the shared channel is created. In some embodiments, the user may elect whether to make the connect channel private (i.e., accessible only by invitation from a current member of the private channel).

In some embodiments, start direct message button 262 allows a user to quickly start a direct message (or multi-person direct message) with external users at an external organization. In some embodiments, the external user identifier at an external organization may be supplied by the instant user as the external user's group-based communication system username or as the external user's email address. In some embodiments, an analysis of the email domain of the external user's email address may affect the message between the user and the external user. For example, the external user's identifier may indicate (for example, based on an email address domain) that the user's organization and the external user's organization are already connected. In some such embodiments, the email address may be converted to a group-based communication system username. Alternatively, the external user's identifier may indicate that the external user's organization belongs to the group-based communication system but is not connected to the instant user's organization. In some such embodiments, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
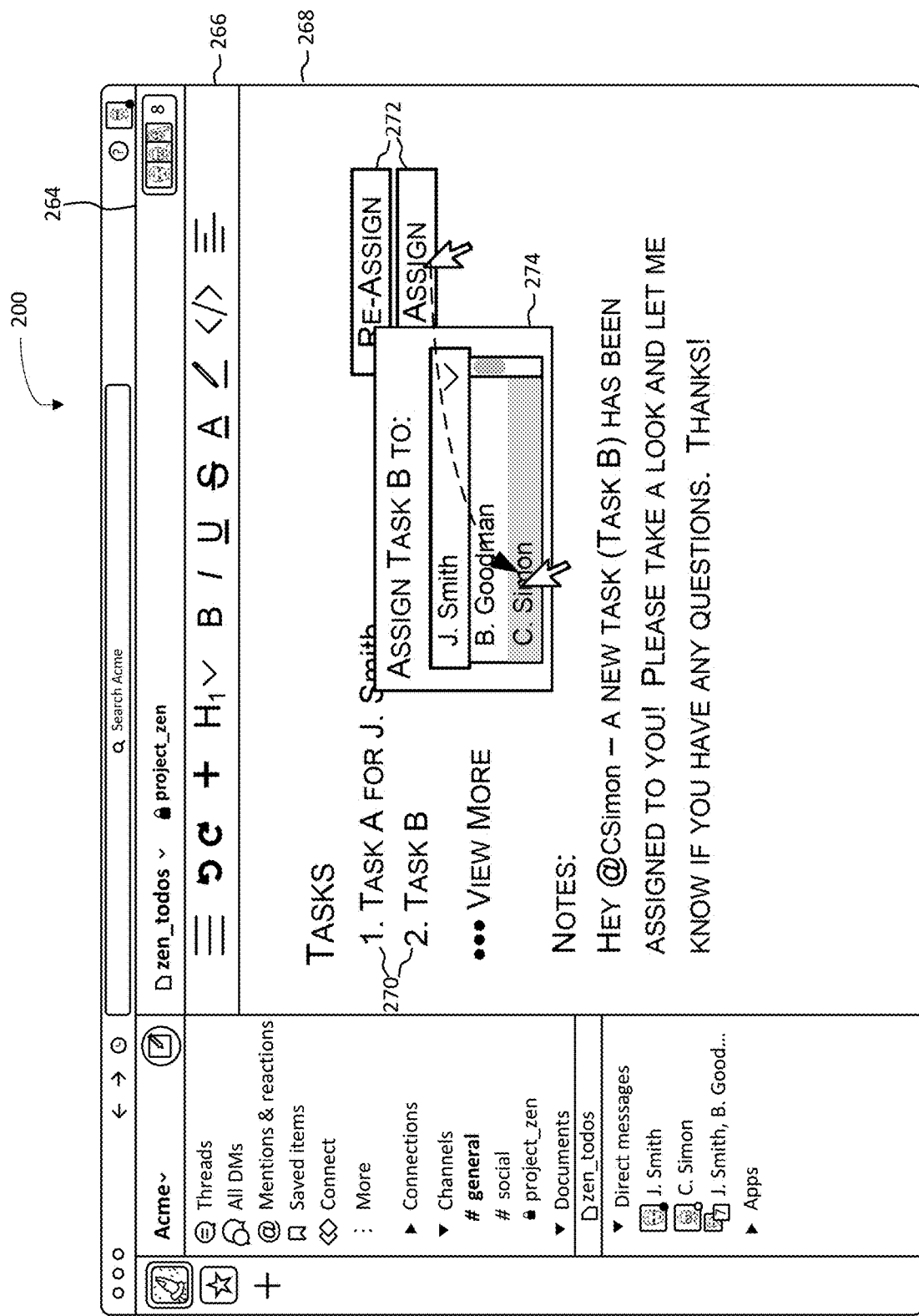
FIG. 2D illustrates a user interface for collaborative documents within the group-based communication system for certain embodiments.

FIG. 2D illustrates user interface 200 displaying collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. Collaborative documents may allow users to simultaneously or asynchronously create and modify documents. Collaborative documents may integrate with the group-based communication system and can both initiate workflows and be used to store the results of workflows. Collaboration document pane 264 may comprise collaborative document toolbar 266 and collaborative document 268. In some embodiments, collaborative document toolbar 266 may provide the ability to bold, italicize, underline, or otherwise format text, the ability to undo or redo actions, the ability to insert and format pictures and shapes, or any other word processing functionality to modify the content within collaborative document 268.

In some embodiments, collaborative documents may comprise free-form unstructured sections and workflow-related structured sections. In some embodiments, unstructured sections may include areas of the document in which a user can freely modify the collaborative document without any constraints. For example, a user may be able to freely type text to explain the purpose of the document. In some embodiments, a user may add a workflow or a structured workflow section by typing the name of (or otherwise mentioning) the workflow. In further embodiments, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some embodiments, structured sections may include text entry, selection menus, tables, checkboxes, tasks, calendar events, or any other document section. In further embodiments, structured sections may include text entry spaces that are a part of a workflow. For example, a user may enter text into a text entry space detailing a reason for approval, and then select a submit button that will advance the workflow to the next step of the workflow. In some embodiments, the user may be able to add, edit, or remove structured sections of the document that make up the workflow components.

In embodiments, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further embodiments, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In embodiments, the first user can select the plurality of collaborative documents and the "Group Information" section to effectuate permissions to access (or view, edit, etc.) to the entire user group the "Group Information" section of each of the plurality of collaborative documents. In some embodiments, the collaborative document comprises one or more tasks 270 along with one or more corresponding assignment options 272, as shown. In some embodiments, an assignment dropdown menu 274 may be displayed in response to a user selecting one of the one or more assignment options 272.

Structure Selection and Content Fill

Embodiments are contemplated in which a workflow template structure is automatically selected based on one or more keywords provided by a user and one or more content fields included in the template structure are automatically filled by submitting a prompt through a conversational interface to a large language model. Accordingly, non-technical users are able to cause generation of workflows automatically without writing code or manually filling in content within a workflow template.

Embodiments of the present disclosure provide a technical solution to one or more of the aforementioned technical problems. Specifically, embodiments of the present disclosure provide automatically selected workflows and other template structures with automatically populated content such that non-technical users are able to arrange complex workflows without manual selection and generation. Further, automatic selection and content fill improves efficiency and reduces manual input even for advanced technical users. Further still, embodiments of the present disclosure improve the accuracy of existing content fill and large language models by automatically generating a suitable prompt including keywords and an indication of a context for a selected template structure.

Figure 3:
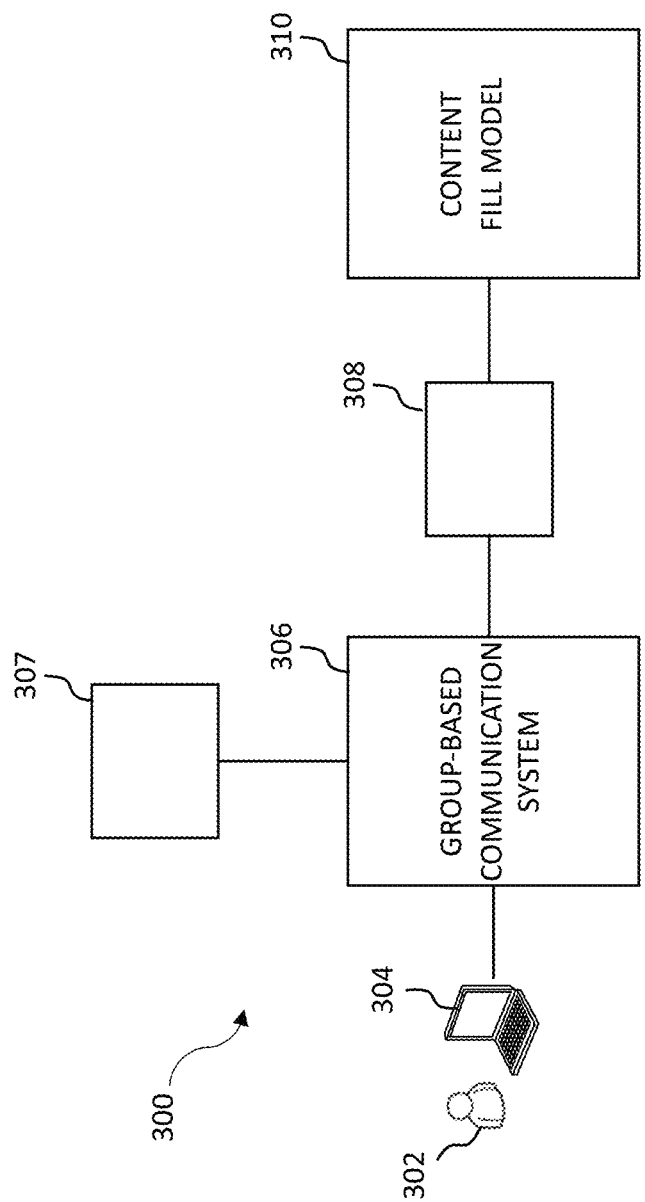
FIG. 3 illustrates an exemplary diagram of a system relating to some embodiments.

FIG. 3 illustrates an exemplary diagram of a system 300 relating to some embodiments. A user 302 interfaces with a user device 304 coupled to a group-based communication system 306. The user device 304 may comprise any of a desktop computer, laptop computer, mobile phone, tablet, or any other suitable form of desktop or mobile device. In some embodiments, a plurality of users may interact with the group-based communication system 306. Similarly, a plurality of user devices 304 may be included. In some embodiments, the group-based communication system 306 may be hosted, at least partially on the user device 304, for example, as an executable application running on the user device 304. Alternatively, or additionally, the group-based communication system 306 may be hosted at least partially on one or more servers. For example, one or more group-based communication system servers may be included for storing and processing information associated with the group-based communication system.

In some embodiments, a machine learning model 307 is included on or coupled to the group-based communication system 306. For example, the machine learning model 307 may comprise a pre-trained machine learning model trained with historical data from the group-based communication system 306 such as a plurality of workflow titles and a plurality of workflow steps corresponding to previously defined workflows of the group-based communication system 306. Embodiments are contemplated in which the machine learning model 307 is additionally trained with other historical data of the group-based communication system 306. For example, the machine learning model 307 may be trained with user data, channel data, and other parameters associated with the group-based communication system 306. Further, in some embodiments, the machine learning model 307 may be retrained with user data, for example, to personalize template structure selection and content fill to a particular user.

In some embodiments, the group-based communication system 306 is communicatively coupled to a conversational interface 308 associated with a content fill model 310. In some embodiments, the content fill model 310 comprises a large language model such as a generative pre-trained transformer (GPT) type language model, for example, ChatGPT or other similar language models. Additionally, or alternatively, in some embodiments, the content fill model 310 may include any one of or a combination of an n-gram language model, an exponential language model, or an artificial neural network such as a recurrent neural network. Accordingly, the group-based communication system 306 may submit a prompt to the content fill model 310 via the conversational interface 308.

In some embodiments, the user 302 submits one or more keywords to the group-based communication system 306, for example, using the user device 304. The group-based communication system 306 then automatically submits a prompt including the one or more keywords to the content fill model 310 via the conversational interface 308. The content fill model 310 receives the prompt and generates an output for the prompt and transmits the output to the group-based communication system 306. For example, in some embodiments, the output from the content fill model 310 comprises a JSON file or other form of digital output. The output of the content fill model 310 may be operable to automatically fill one or more content fields of a workflow template structure generated or selected for the one or more keywords.

Figure 4:
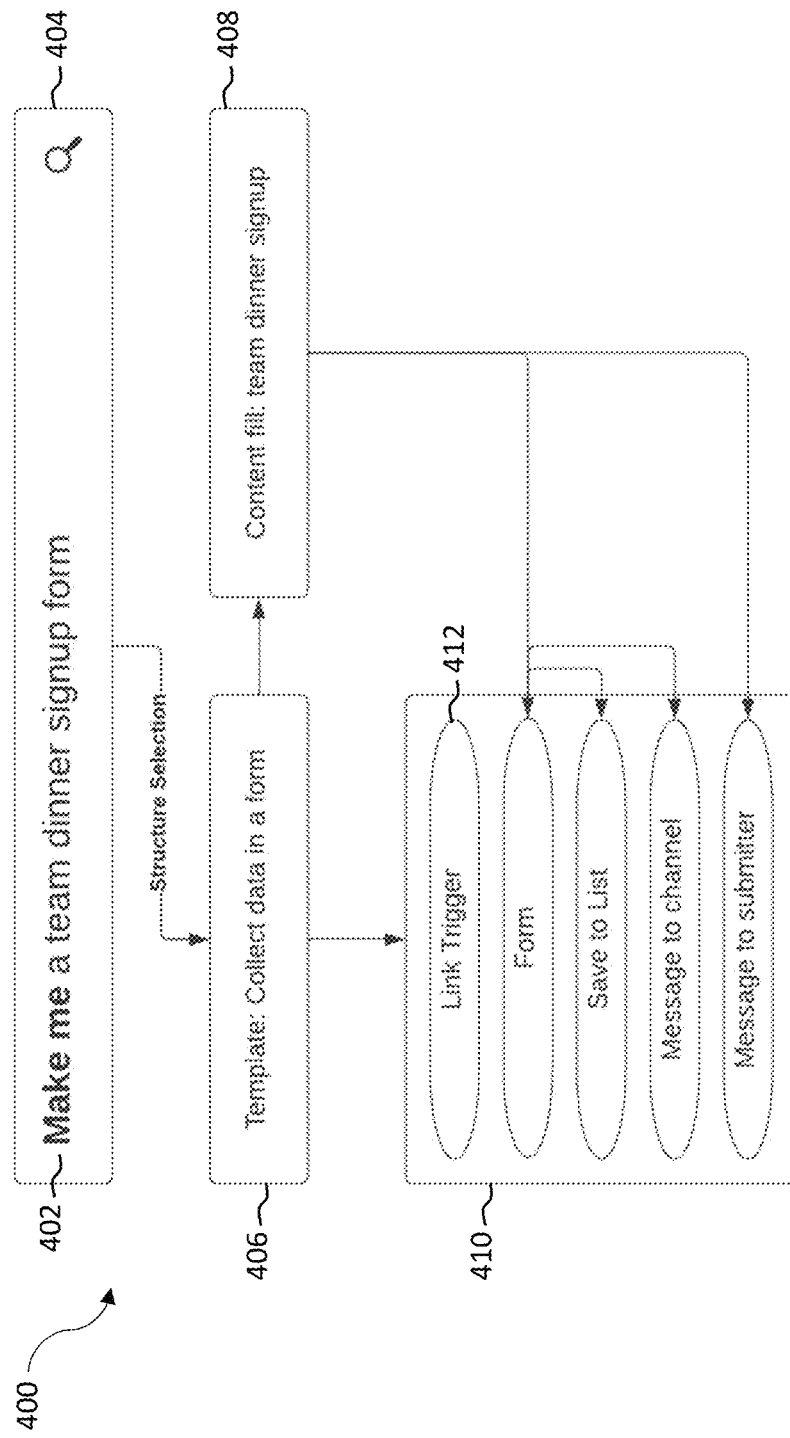
FIG. 4 illustrates an exemplary flow diagram of a structure selection and content fill process relating to some embodiments.

FIG. 4 illustrates an exemplary flow diagram of a structure selection and content fill process 400 relating to some embodiments. In some embodiments, the structure selection and content fill process 400 includes receiving a user input 402 into an input field 404 associated with the group-based communication system. For example, the input field 404 may be included within a user interface of the group-based communication system. In some embodiments, the user input 402 comprises textual input including one or more keywords. For example, the input field 404 may be configured to receive textual input from the user including the one or more keywords.

A template structure 406 is generated and/or selected based at least in part on the user input 402. In some embodiments, the template structure 406 comprises one or more workflow steps that, during execution of the workflow, are operable to automatically perform actions within the group-based communication system or within one or more external applications. In some embodiments, the template structure 406 is selected based on the one or more keywords included in the user input 402. It should be understood that, in some embodiments, the template structure 406 may be automatically generated as a new template or selected from an existing set of predefined templates. Further still, in some embodiments, the template structure 406 may be generated by automatically modifying an existing template. For example, the template structure 406 may be generated by adding, removing, or altering one or more steps/objects in an existing template.

In one example, the user input 402 includes textual input "Make me a team dinner signup form", as shown. Accordingly, keywords associated with an action statement may be identified within the user input 402. In this case, the keywords identified as being associated with the action statement comprise "Make me". Accordingly, the template structure 406 is selected based at least in part on these keywords. In this example, the template structure 406 that is selected comprises a template for collecting data in a form. Alternatively, in some embodiments, the action item may be automatically assumed regardless of the text provided. Accordingly, in such embodiments, the phrase "Make me" may be discarded and the structure is selected based on the phrase "team dinner signup form". However, it should be understood that a variety of other form templates are also contemplated based on a plurality of other keywords.

A content fill request 408 may be generated based on the user input 402 and the template structure 406. In some embodiments, the content fill request 408 may be submitted as a prompt to a large language model such as content fill model 310. For example, the prompt may include one or more keywords from the user input 402, as well as an indication of the selected template structure. The indication of the selected template structure may include a context of one or more content fields within the selected template structure such that the content fill model 310 is able to identify where content should be populated.

A workflow structure 410 is generated by populating at least a portion of the content fields within the selected template structure 406 with output content from the content fill request 408. For example, the output content may comprise output from the content fill model 310. Said output content determined based at least in part on keywords from the initial user input 402 submitted by the user. In some embodiments, a content field of at least one step 412 of the workflow structure 410 may be filled via the content output of the content fill request 408. The content output may be used to dress the template structure with one or more pieces of automatically populated content. In some such embodiments, the automatically populated content may include any of textual content, imagery, font, formatting, styles, and other forms of content to be added to the template structure.

Figure 5:
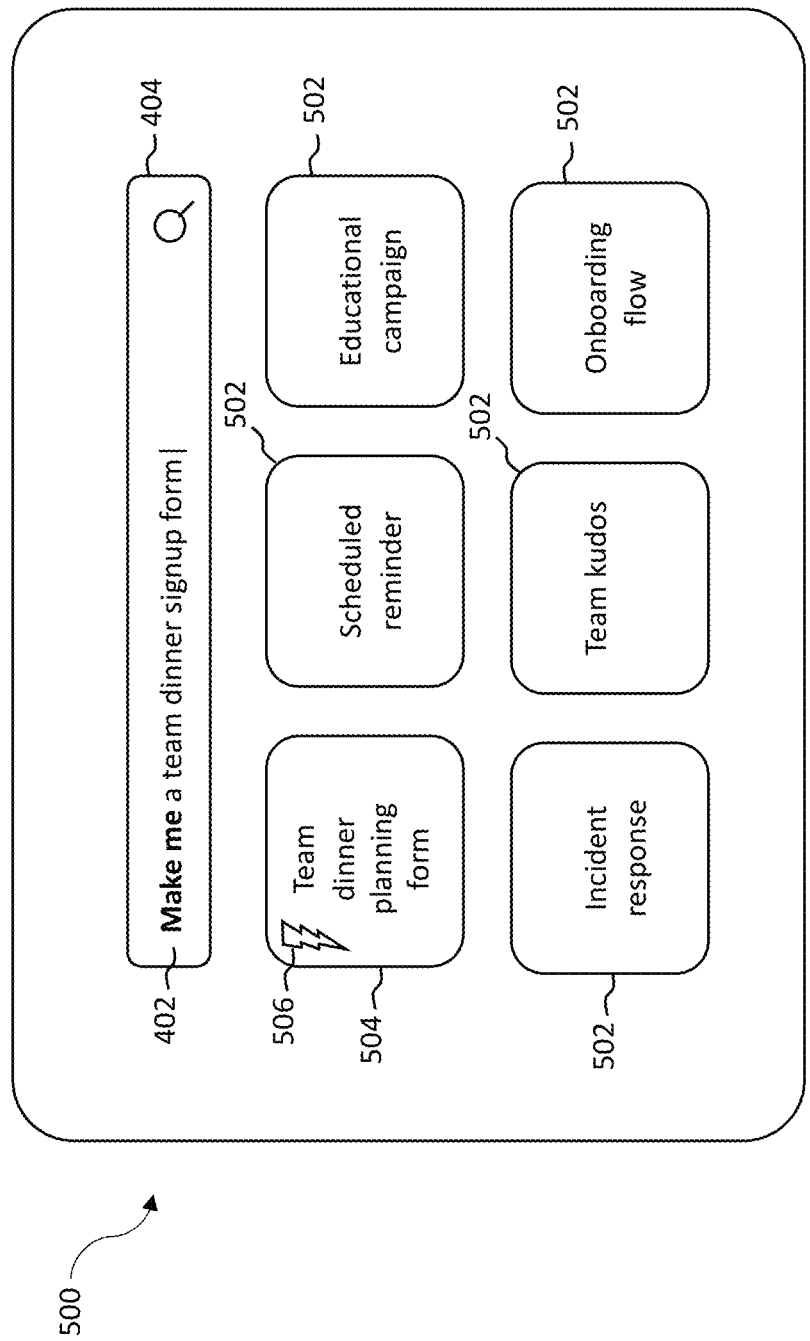
FIG. 5 illustrates a portion of an exemplary user interface relating to some embodiments.

FIG. 5 illustrates a portion of an exemplary user interface 500 relating to some embodiments. In some embodiments, the user interface 500 may be associated with the group-based communication system. For example, the user interface 500 may comprise a group-based communication system user interface associated with a group-based communication system application. In some embodiments, the user interface 500 (or any other user interface described herein) may be included within a modal window associated with the group-based communication system. Additionally, or alternatively, the user interfaces described herein may be included within a main window of the group-based communication system. The user interface 500 includes the input field 404 with the user input 402, as shown. In some embodiments, the user interface 500 may be associated with a workflow builder tool of the group-based communication system.

One or more suggested workflow templates 502 may be presented within the user interface 500, as shown. Said one or more suggested workflow templates 502 are not automatically selected and/or not automatically populated with content. In some embodiments, the one or more workflow templates 502 may be selectively presented based at least in part on the user input 402 or based on other factors associated with a user or the group-based communication system. For example, in some embodiments, the one or more workflow templates 502 may be selected for display based on any one of or a combination of recent use, keywords, user data, or other factors associated with the group-based communication system.

An automatically selected workflow template 504 that is automatically selected and content filled is included on the user interface 500, as shown. In some embodiments, the automatically selected workflow template 504 is selected and suggested based at least in part on the user input 402. For example, the automatically selected workflow template 504 may be selected and filled based at least in part on the one or more keywords. In some embodiments, a plurality of distinct automatically selected workflow templates may be presented.

In some embodiments, an automatic indicator 506 is included with the automatically selected workflow template 504 to indicate that the automatically selected workflow template 504 is automatically selected and filled. The automatic indicator 506 may be used to distinguish the automatically selected workflow template 504 from the one or more workflow templates 502 that are not automatically selected and/or not automatically filled in with content. It should be understood that a variety of other forms of automatically selected and content filled workflows are also contemplated. For example, in some embodiments, an incident response workflow may be automatically presented based on a user input requesting creation of an incident response workflow. Similarly, a team offsite signup form may be automatically generated responsive to a user input requesting to create a team offsite workflow, a customer feedback submission may be presented responsive to a user input requesting to create a customer feedback workflow, or a bug reporting submission may be generated responsive to a user input requesting to create a bug report flow.

Figure 6:
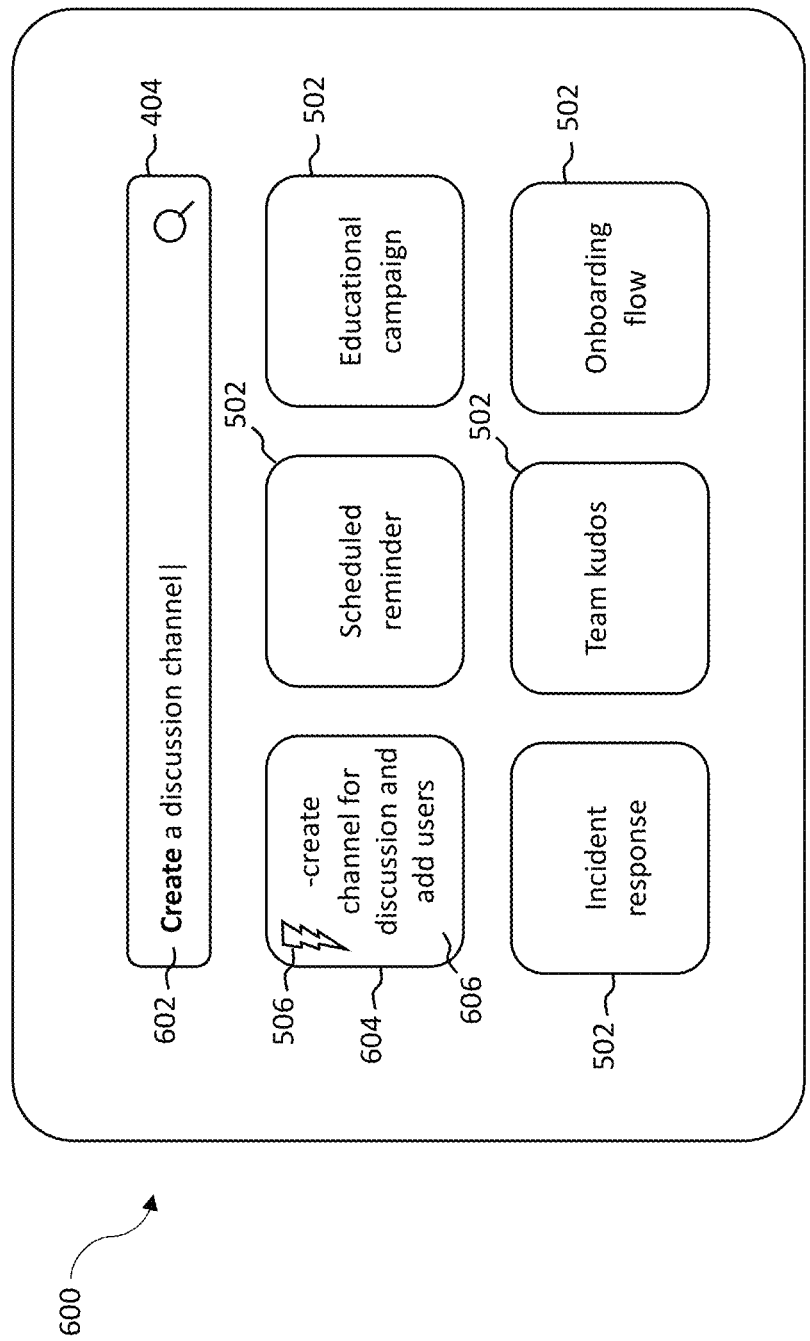
FIG. 6 illustrates a portion of an exemplary user interface relating to some embodiments.

FIG. 6 illustrates a portion of an exemplary user interface 600 relating to some embodiments. In such embodiments, a template selection and content fill process is contemplated that provides other forms of automatically selected and filled structures in addition to workflow templates. For example, a similar selection and content fill process may be utilized to automatically select a channel template and fill in content of the channel template based at least in part on one or more keywords from a user input. In some embodiments, the user interface 600 may persist outside of a workflow builder tool of the group-based communication system. For example, the user interface 600 may be entirely distinct from the user interface 500, as described above, and may interact with a separate artificial intelligence implementation.

The exemplary user interface 600 includes the input field 404, as described above. A user input 602 is received from a user into the 404, as shown. In such embodiments, the user input 602 includes a textual input comprising one or more keywords requesting to create a channel within the group-based communication system. Responsive to receiving the user input 602, one or more automatically selected template structures may be presented to the user within the user interface 600, such as an automatically selected channel template structure 604, as shown.

In some embodiments, the channel template structure 604 may include the automatic indicator 506 indicating that the channel template structure 604 has been automatically selected and content filled. For example, the channel template structure 604 may be automatically filled to include an automatically generated channel description, (not shown). Similarly, in some embodiments, other parameters of the channel template structure 604 are also automatically generated or filled in. For example, a suggested channel name for the channel template structure 604 may be automatically generated and filled in. In some embodiments, the channel template structure 604 comprises a list of steps 606, such as steps for creating the channel and adding users to the channel, as shown.

In some embodiments, the automatically generated channel description may be added responsive to receiving content output from the content fill model 310. For example, a prompt including one or more keywords along with an indication of the channel template structure may be submitted to the content fill model 310, which returns content fill output configured to fill in one or more content fields of the channel template structure 604 such as the channel description.

In one example, a user submits a user input 602 including textual input such as, "Create a discussion channel". Accordingly, a channel template structure 604 is automatically selected based at least in part on the keyword 'channel'. At least a portion of the user input 602 is submitted to the content fill model 310, which returns content output to fill in content of the channel template structure 604. For example, the content output may be configured to automatically fill in a channel name for the channel template structure 604 as, "#discussion" and a channel description for the channel template structure 604 as "-channel for discussing" based at least in part on the keyword 'discussion' from the user input 602.

It should be understood that embodiments are contemplated in which a variety of other types of channel template structures are automatically selected based on respective keywords from subsequent user inputs. For example, a template for a project channel relating to a particular work project may be generated with content automatically filled corresponding to the project. Further, embodiments are contemplated in which one or more files and/or other content is automatically added to the channel template based on the one or more keywords. For example, if the channel template relates to a particular project, files associated with that project may be automatically added to the channel or suggested to be added to the channel based on a correlation with said project.

In some embodiments, similar template structures are contemplated for other types of structures not explicitly shown and described herein in addition to workflow templates and channel templates. For example, in some embodiments, a canvas template may be automatically selected and/or generated within the group-based communication system responsive to a user input with the canvas template being automatically filled with content output from the content fill model. Further, in some embodiments, template structures are contemplated for lists, tables, and other objects associated with the group-based communication system. For example, a list template structure may be selected for generating a particular type of list or spreadsheet.

Figure 7:
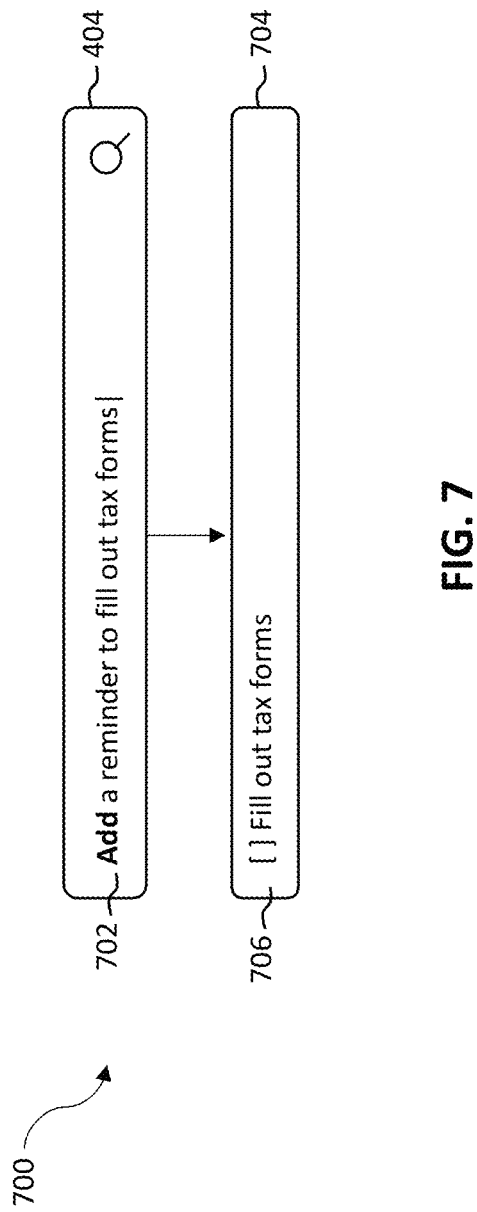
FIG. 7 illustrates an exemplary flow diagram of a subsequent structure selection and content fill process relating to some embodiments.

FIG. 7 illustrates an exemplary flow diagram of a subsequent structure selection and content fill process 700 relating to some embodiments. For example, the subsequent structure selection and content fill process 700 may be used to add an additional step or other object to a newly created or pre-existing template structure.

A user input 702 may be received from a user into the input field 404 including textual input requesting to add an additional item to an existing template structure. For example, the user input 702 may include at least one keyword identifying an existing template structure and at least one keyword used to auto-fill content within an additional item added to the template structure. In some embodiments, a newly selected additional step 704 may be selected and/or generated for addition to an existing workflow template. The additional step 704 may include computer-executable instructions 706, which may be automatically populated with content from the content output of the content fill model 310.

Many of the examples described above involve receiving a user input into an input field, however, in some embodiments, other forms of initiating the structure selection and content fill are contemplated. For example, a template structure may be suggested to a user responsive to a user action within the group-based communication system or an external application, such that the user does not have to explicitly search or request a template structure. Here, a template structure may be selected and recommended to the user based on determining that the user is struggling to accomplish a task or doing something that could be automated to increase efficiency. For example, if it is determined that the user is attempting to create a sign-up form, a sign-up form template may be automatically selected and presented to the user.

In some embodiments, a variety of forms of additional workflow steps are contemplated. For example, a workflow step may be added for generating a modal window within the group-based communication system. Such a modal window may be used to collect data inputs from a user, provide a notification to the user, or to interact with the user in another suitable way.

Figure 8:
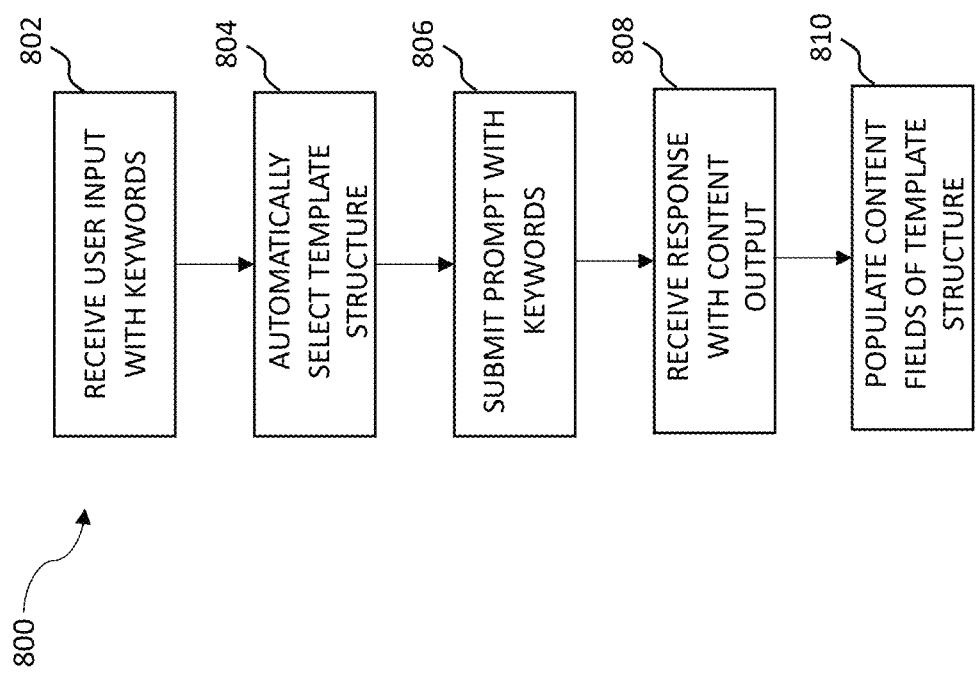
FIG. 8 illustrates an exemplary method for structure selection and content fill relating to some embodiments.

FIG. 8 illustrates an exemplary method 800 for structure selection and content fill relating to some embodiments. In some embodiments, at least a portion of the method 800 may be performed by one or more processors. For example, at least one processor associated with the group-based communication system may be used to execute computer-readable media to perform one or more steps of the method.

At step 802, a user input including one or more keywords is received from a user. For example, the user input may comprise textual input received from the user into an input field of a user interface associated with the group-based communication system. Alternatively, or additionally, the user input may be received by the user interacting with an interface object within the group-based communication system, or via a speech-to-text input mechanism that converts an audible input from the user into a digital text format.

At step 804, a template structure is automatically selected based at least in part on the user input. For example, the template structure may be selected based on one or more keywords of the user input. In some embodiments, the template structure is a workflow template structure such as the template structure 406, as described above. The template structure may be selected from a plurality of predefined template structures. For example, if the template structure is a workflow template structure, the workflow template structure may be selected from a plurality of workflow template structures based at least in part on the one or more keywords.

In some embodiments, the template structure is automatically selected using a machine learning model that is pre-trained with a set of training data. For example, the machine learning model may be trained using historical data associated with the group-based communication system, such as any of workflow titles, workflow steps, other suitable forms of historical data, and combinations thereof. In some such embodiments, the machine learning model may be coupled to or hosted on the group-based communication system. For example, the machine learning model may be hosted on a server of the group-based communication system or may be externally coupled thereto. Further, it should be understood that, in some embodiments, the template structure may be automatically generated by the machine learning model. For example, a workflow template structure may be newly generated by combining one or more workflow steps from existing template structures or by defining new workflow steps, which are not already present in existing workflow templates.

At step 806, at least one prompt including the one or more keywords is submitted to a content fill model. In some embodiments, the prompt is submitted to a conversational interface associated with a large language model, as described above. However, it should be understood that a variety of other forms of suitable content fill models are also contemplated. Further, in some embodiments, the at least one prompt also includes the selected template structure.

At step 808, a response including content output is received from the content fill model. In some embodiments, the content output comprises any combination of text, executable instructions, or other forms of information. For example, in some embodiments, the content output includes a JSON file or other suitable file type operable to automatically fill in one or more content fields within the template structure.

At step 810, one or more content fields of the template structure are automatically populated with content from the content output provided by the content fill model. For example, as described above, the content output may comprise a JSON file (or other file type) configured to automatically fill in content fields within the template structure. Accordingly, the one or more content fields may be filled responsive to receiving the content output from the content fill model. Further still, embodiments are contemplated in which the content output and content fill further comprises imagery and other output in addition to textual output. For example, the content fill may include filling textual input fields in addition to adding one or more images to the template structure. For example, if the template structure is a dinner planning workflow template structure, an image of a dinner plate may be automatically generated and added to the template structure. It should be understood that a variety of other forms of imagery and content output not explicitly described herein are also contemplated.

In some embodiments, subsequent steps may be included in the process flow. For example, in some embodiments, additional user input may be received to further update and edit content within the template structure. For example, the user may review the automatically populated content and edit text or imagery to change the template structure. Additionally, in some embodiments, the user may submit subsequent user inputs to add additional steps or other items to the template structure, as will be described in further detail below. Further, in some embodiments, one or more additional steps are included for presenting the populated template structure to a user. For example, the populated template structure (or an indication thereof) may be caused to be displayed among one or more indications of non-automatically selected template structures such as the one or more workflow templates 502. Additionally, steps may be included for storing the selected and populated template structure within a data store associated with the group-based communication system.

FIG. 9 illustrates an exemplary method 900 for step addition and content fill relating to some embodiments. In some embodiments, the selection and content fill process described herein may be used to add additional items or steps to an existing template structure. For example, an additional step may be added to an existing workflow based on keywords in a user input.

At step 902, a user input is received including one or more keywords. The user input may be a subsequent user input received after the user input of step 802, described above. The user input may include textual input requesting to add an additional step to an existing workflow.

At step 904, a workflow step is automatically selected or generated based on the user input. In some embodiments, the workflow step may be selected based on one or more keywords within the user input. For example, if the user input includes text "Add a reminder to fill out tax forms", a step may be selected for adding a reminder step to a workflow.

At step 906, a prompt including one or more keywords from the user input is submitted to the content fill model 310. In some embodiments, the prompt further includes an indication of the automatically selected workflow step to provide context to the content fill model 310 of content to be filled. Additionally, or alternatively, embodiments are contemplated in which at least a portion of the workflow that the step is being added to is also included in the prompt to give the context of the entire workflow. In some such embodiments, previously filled content of the workflow may be considered such that the format and style of the additional step matches that of the existing workflow. The content fill model 310 receives the prompt and generates content output operable to fill one or more content fields within the additional workflow step.

At step 908, a response is received from the content fill model 310 including the content output generated for the prompt. The content output may include a JSON file, as described above, or another suitable format to fill content in the workflow step. Additionally, in some embodiments, the content output includes additional items such as imagery, file attachments, or modifications to the layout of the additional workflow step.

At step 910, one or more content fields of the additional workflow step are automatically filled based on the content output from the content fill model 310. In some embodiments, the content fill comprises added textual terms, buttons, layouts, and other content included in the workflow step. For example, the workflow step may comprise generating and sending a reminder message to a user of the group-based communication system with the contents of the message filled in automatically based on the content output.

Additionally, or alternatively, embodiments are contemplated in which a plurality of workflow steps or other additional items are added to a workflow responsive to a single user input. For example, a user may provide an input include textual input requesting to "add reminders to fill out tax forms and to upload proof of address". Responsive to the user input, a first step may be added for sending a reminder to fill tax forms and a second step may be added for sending a reminder to upload a proof of address. It should be understood that the examples given are merely exemplary and that a variety of other workflow steps and additional items not explicitly described herein are also contemplated

Having thus described various embodiments of the present disclosure, what is claimed as new and desired to be protected by Letters Patent includes the following:

1. One or more non-transitory computer-readable media that store computer-executable instructions that, when executed by at least one processor, perform a method for generating a workflow within a group-based communication system, the method comprising:
receiving, from a user of the group-based communication system, a user input comprising one or more keywords;
automatically selecting a workflow template structure based at least in part on the one or more keywords;
submitting at least one prompt to a conversational interface associated with a large language model, the at least one prompt comprising at least the one or more keywords and an indication of the workflow template structure;
receiving, from the large language model, a response through the conversational interface; and
responsive to receiving the response from the conversational interface, automatically populating one or more content fields of the workflow template structure based on the response from the conversational interface.

2. The one or more non-transitory computer-readable media of claim 1, wherein the workflow template structure comprises a plurality of workflow steps.

3. The one or more non-transitory computer-readable media of claim 2, wherein at least one of the plurality of workflow steps is associated with the one or more content fields.

4. The one or more non-transitory computer-readable media of claim 1, wherein the method further comprises:
storing the workflow template structure within a data store associated with the group-based communication system for later use.

5. The one or more non-transitory computer-readable media of claim 1, wherein the workflow template structure is automatically selected based further in part on group-based communication system user data associated with the user.

6. The one or more non-transitory computer-readable media of claim 1, wherein the user input comprises textual input including the one or more keywords and the textual input is received into an input field of a user interface associated with the group-based communication system.

7. The one or more non-transitory computer-readable media of claim 1, wherein the workflow template structure is automatically selected using a machine learning model pre-trained with a set of training data including a plurality of workflow titles and a plurality of workflow steps.

8. A method for generating a workflow template within a group-based communication system, the method comprising:
receiving, from a user of the group-based communication system, a user input comprising one or more keywords;
automatically selecting a workflow template structure based on the one or more keywords, the workflow template structure comprising a plurality of steps and one or more content fields;
submitting at least one prompt to a conversational interface associated with a large language model, the at least one prompt comprising at least the one or more keywords from the user input;
receiving, from the large language model, a response through the conversational interface; and
responsive to receiving the response from the conversational interface, automatically populating the one or more content fields of the workflow template structure based on the response from the conversational interface.

9. The method of claim 8, further comprising:
causing for display to the user, within a user interface associated with the group-based communication system, an indication of the workflow template structure.

10. The method of claim 9, wherein the indication of the workflow template structure is displayed among one or more indications of non-automatically selected workflow templates.

11. The method of claim 10, further comprising:
causing for display to the user, within the user interface associated with the group-based communication system, an automatic indicator with the indication of the workflow template structure indicating that the workflow template structure has been automatically selected.

12. The method of claim 8, wherein the at least one prompt to the conversational interface further comprises an indication of the workflow template structure.

13. The method of claim 8, further comprising:
receiving, from the user, a selection of the workflow template structure; and
responsive to receiving the selection of the workflow template structure from the user, generating an automated workflow based on the workflow template structure.

14. The method of claim 13, further comprising:
receiving, from the user, one or more edits to the workflow template structure; and
updating the automated workflow based on the one or more edits to the workflow template structure.

15. A system comprising:
at least one processor; and
one or more non-transitory computer-readable media that store computer-executable instructions that, when executed by the at least one processor, perform a method for generating a workflow within a group-based communication system, the method comprising:
receiving, from a user of the group-based communication system, a user input comprising one or more keywords;
automatically selecting a workflow template structure based at least in part on the one or more keywords;
submitting at least one prompt to a content fill model, the at least one prompt comprising at least the one or more keywords from the user input;
receiving, from the content fill model, a response to the at least one prompt, the response comprising content output; and
responsive to receiving the response from the content fill model, automatically populating one or more content fields of the workflow template structure based on the content output of the response.

16. The system of claim 15, wherein the content fill model comprises an external large language model associated with a conversational interface.

17. The system of claim 15, wherein the workflow template structure is automatically selected based further in part on historical data associated with one or more other workflow template structures.

18. The system of claim 15, wherein the method further comprises:
submitting at least one subsequent prompt to the content fill model responsive to receiving a subsequent user input.

19. The system of claim 15, wherein the workflow template structure is automatically generated responsive to the user input.

20. The system of claim 15, wherein the workflow template structure is selected from a plurality of predefined workflow template structures.

* * * * *